US012395479B1

(12) United States Patent
Butler et al.

(10) Patent No.: US 12,395,479 B1
(45) Date of Patent: Aug. 19, 2025

(54) CROSS-USER ACCOUNT MANAGEMENT ON USER DEVICES

(71) Applicant: Amazon Technologies, Inc., Seattle, WA (US)

(72) Inventors: Matthew Butler, Seattle, WA (US); Ching-Heng Chiu, Irvine, CA (US); Charles Martin Babington, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 295 days.

(21) Appl. No.: 17/952,788

(22) Filed: Sep. 26, 2022

(51) Int. Cl.
*H04L 9/40* (2022.01)

(52) U.S. Cl.
CPC .................... *H04L 63/08* (2013.01)

(58) Field of Classification Search
None
See application file for complete search history.

(56) References Cited

U.S. PATENT DOCUMENTS

| | | | | |
|---|---|---|---|---|
| 2005/0267840 A1* | 12/2005 | Holm-Blagg | .......... | G06Q 20/10 705/39 |
| 2011/0314039 A1* | 12/2011 | Zheleva | ................ | G06F 16/437 703/2 |
| 2014/0067712 A1* | 3/2014 | Prasad | .................... | G06Q 40/06 705/36 R |
| 2015/0081496 A1* | 3/2015 | Rowe | ................... | G06Q 20/227 705/35 |
| 2021/0279793 A1* | 9/2021 | Leise | ..................... | G06Q 40/06 |
| 2022/0394349 A1* | 12/2022 | Sanders | ............ | H04N 21/4668 |

OTHER PUBLICATIONS

Boylis, Travis. "How to Make an Amazon Account" Posted at <https://www.wikihow.com/Make-an-Amazon-Account> on Feb. 6, 2020 (Year: 2020).*
Eck, Melissa. "Netflix Warns of Global Crackdown on Password Sharing" Posted on katv.com on Apr. 20, 2022 (Year: 2022).*
Perez, Sarah. "Amazon Prime Video finally launches user profiles to all customers worldwide." Posted at <https://techcrunch.com/2020/07/07/amazon-prime-video-finally-launches-user-profiles-to-all-customers-worldwide/> on Jul. 7, 2020 (Year: 2020).*

(Continued)

*Primary Examiner* — Scott B Christensen
(74) *Attorney, Agent, or Firm* — Kilpatrick Townsend & Stockton LLP

(57) ABSTRACT

Techniques are disclosed for generating a ranked list of content for a user account of a service provider. A server device can determine that a first user account of a service provider is linked with a second user account of the service provider. The server device can then determine whether the first user account has been registered with the service provider a time period less than a threshold time. In response, the server device can determine interaction information associated with the second user account and generate, using a ranking model taking the interaction information as an input, a ranked list of content offered by the service provider. The server device can then cause the user device to present content at a graphical user interface of the user device according to the ranked list of content.

20 Claims, 8 Drawing Sheets

(56) References Cited

OTHER PUBLICATIONS

Chen, et al., Neural attention rating regression with review-level explanations. In *Proceedings of the 2018 World Wide Web Conference*, pp. 1583-1592, 2018.
Cortes, Cold-start recommendations in collective matrix factorization. webpage found at: https://arxiv.org/abs/1809.00366, 2018.
Dziugaite, et al., Neural network matrix factorization. webpage found at: https://arxiv.org/abs/1511.06443, 2015.
Fu, et al., Deeply fusing reviews and contents for cold start users in cross-domain recommendation systems. In *Proceedings of the AAAI Conference on Artificial Intelligence*, vol. 33, pp. 94-101, 2019.
Zhang, et al., Trustsvd: Collaborative filtering with both the explicit and implicit influence of user trust and of item ratings. In *Proceedings of the AAAI conference on artificial intelligence*, vol. 29, 2019.
He, et al., Neural factorization machines for sparse predictive analytics. In *Proceedings of the 40th International ACM SIGIR conference on Research and Development in Information Retrieval*, pp. 355-364, 2017.
Koren, et al., Factorization meets the neighborhood: a multifaceted collaborative filtering model. In *Proceedings of the 14th ACM SIGKDD international conference on Knowledge discovery and data mining*, pp. 426-434, 2008.
Koren, et al., Matrix factorization techniques for recommender systems. Published by the IEEE Computer Society, *Computer*, 42(8):30-37, Aug. 2009.
Ma, et al., Recommender systems with social regularization. In *Proceedings of the fourth ACM international conference on Web search and data mining*, pp. 287-296, 2011.
Salakhutdinov, et al., Probabilistic Matrix Factorization. *Advances in neural information processing systems*, 20, 2007.
Sarwar, et al., Item-based collaborative filtering recommendation algorithms. In *Proceedings of the 10th international conference on World Wide Web*, pp. 285-295, 2001.
Singh, et al., Relational learning via collective matrix factorization. In *Proceedings of the 14th ACM SIGKDD international conference on Knowledge discovery and data mining*, pp. 650-658, 2008.
Volkovs, et al., Dropoutnet: Addressing cold start in recommender systems. *Advances in neural information processing systems*, 30, 2017.
Wang, et al., Collaborative deep learning for recommender systems. In *Proceedings of the 21st ACM SIGKDD international conference on knowledge discovery and data mining*, pp. 1235-1244, 2015.
Wei, et al., Collaborative filtering and deep learning based recommendation system for cold start items. *Expert Systems with Applications*, 69:29-39, 2017.
Wu, et al., A neural influence diffusion model for social recommendation. In *Proceedings of the 42nd international ACM SIGIR conference on research and development in information retrieval*, pp. 235-244, 2019.
Xin, et al., Relational collaborative filtering: Modeling multiple item relations for recommendation. In *Proceedings of the 42nd international ACM SIGIR conference on research and development in information retrieval*, pp. 125-134, 2019.
Zheng, et al., Joint deep modeling of users and items using reviews for recommendation. In *Proceedings of the tenth ACM international conference on web search and data mining*, pp. 425-434, 2017.

\* cited by examiner

CROSS-USER ACCOUNT MANAGEMENT ON USER DEVICES

BACKGROUND

Recommender systems are used to personalize and improve user experiences with online services. Because of the vast amount of content and the small available display area of devices like phones and tablets, accurate and efficient user interface personalization is desirable. Typical systems can make use of a user account's previous interactions with an online service to tailor future user interface personalization for that account, such as by showing a particular arrangement of tiles or icons and content therewithin on a graphical user interface of a device on which the account is logged in. However, new accounts lack the prior interactions with the online services, leading to a cold-start problem.

BRIEF DESCRIPTION OF THE DRAWINGS

Various embodiments in accordance with the present disclosure will be described with reference to the drawings, in which.

DETAILED DESCRIPTION

Figure 1:
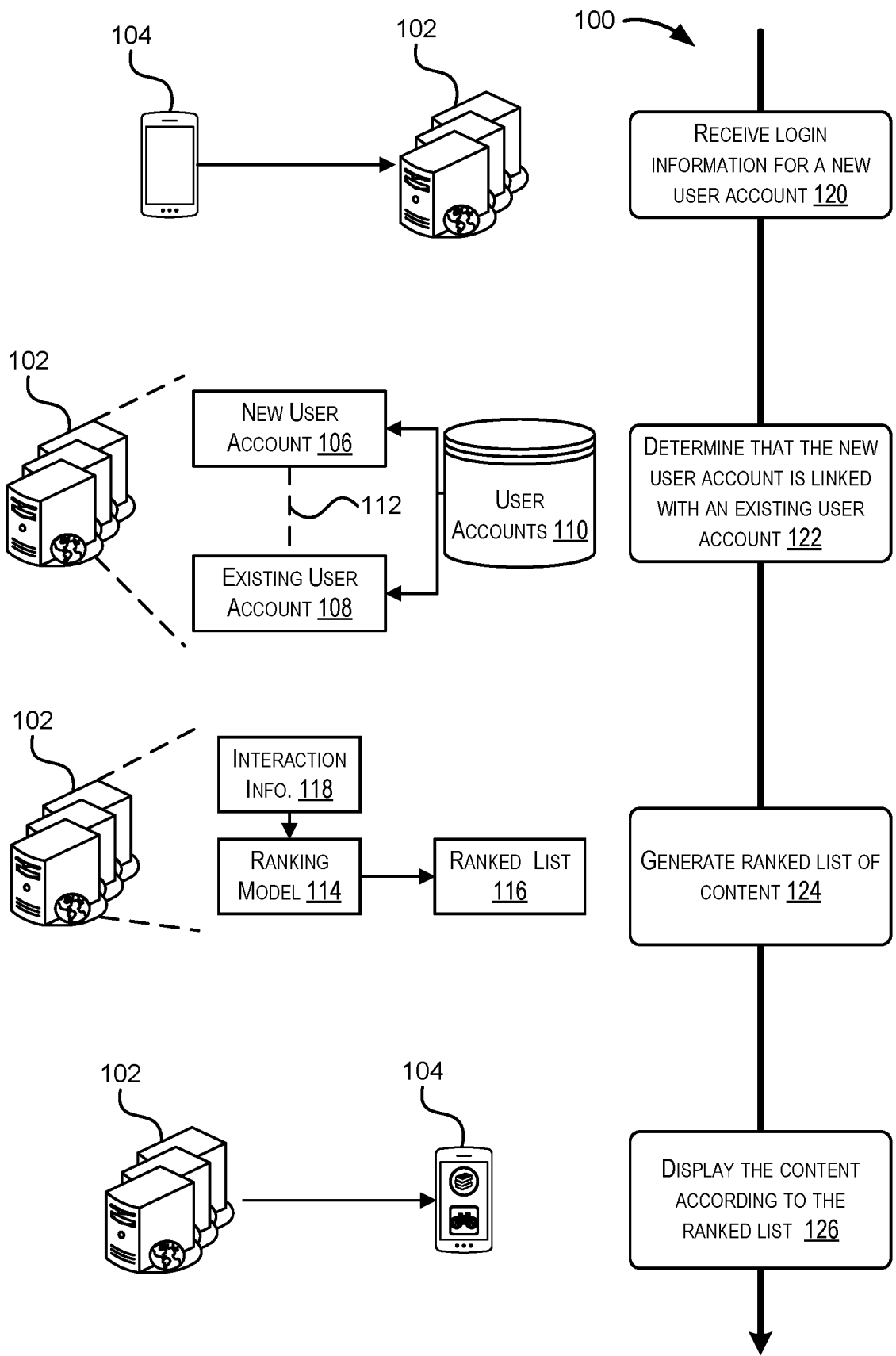
FIG. 1 is a block diagram and associated flow chart of an example process to generate a ranked list of content from a ranking model trained using interaction information from a linked account, according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Online service providers can offer substantial amounts of online content to users via their online services (e.g., web-sites, cloud-based applications, etc.). The content can include videos to watch, apps to download and use, items to obtain, and the like. To determine which content to present at a user interface of a user device (e.g., customize the content displayed in an application's graphical user interface, customize content presented audibly via a voice assistant user interface), the service providers can make use of recommender systems to curate the content to the preferences of individual users. The recommender systems can make use of predictive models to determine which content best matches preferences associated with a user account. These predictive models typically use information about the particular user account, including the previous interactions with the online services, other content viewed or selected during a session with the user account, explicit indications about what the preferences of the user account, and so on. The models can also use information that relates a particular user account to other user accounts based on similarities between the user account and other user accounts of a service provider's online services (e.g., similar content accessed, similar user interests, similar user information, etc.) as part of collaborative filtering.

Embodiments of the present disclosure are directed to, among other things, techniques for using a model (e.g., a ranking model) in a recommender system to produce rankings of content when information about the user account is insufficient and/or accessible as an input into the model. For example, a new user account registered with a service provider may not, by virtue of being new, have previous interaction information with the service provider that can be used as an input into a ranking model. Moreover, information about the new account, including information pertaining to user account preferences, the user demographics, and the like, may not be available due to privacy restrictions for the account. This particular "cold-start" problem can therefore be difficult to solve using conventional collaborative filtering techniques, since the recommender system does not have information about the new user account with which to make associations with other, similar user accounts. The recommender system (e.g., a computer system implementing the ranking model) can determine that the new user account is linked to an existing user account and use a portion of the interaction information associated with that existing user account as an input into the model. The portion of the interaction information may be qualified based on the type of the new account and its relationship to the existing account.

To illustrate, consider an example of a new user account being created on a new tablet device that provides access to content from a service provider (e.g., a service provider offering videos among a variety of other content). The new user account with the service provider may be linked to an existing account with the same service provider (e.g., an account that accesses general content, including books). Because the account is new, the service provider may not have information (e.g., the types of videos watched) with respect to what videos may be preferred out of the videos that are available. To recommend videos that may be preferred, the recommender system can determine that the new user account is linked with the existing account and obtain interaction information for the existing account with the service provider. The recommender system can determine a portion of the existing account's interaction information that is pertinent to predicting preferences for a linked account by identifying a qualifier for the new user account. In this example, the qualifier can be that the account is intended to view educational videos and that the recommender system need not rely on specific details about the new account in order to maintain privacy. The qualified interaction information can then include interactions of the existing account with the service provider that relate to the qualifier. For example, the existing account previously searching for and/ or viewing a specific educational book in the service provider application or on the service provider website can be qualified interaction information with respect to a linked account used to view educational videos. The qualified interaction information may be input to the ranking model to generate a ranked list of content (e.g., educational videos that may be similar to the educational book previously viewed by the existing account).

Embodiments of the present disclosure are also directed to techniques for training a ranking model to make use of the interaction information from the existing, linked account. The computer system implementing the ranking model can train the ranking model using collective matrix factorization (CMF) techniques. The training data can include interaction information from other accounts with a service provider and can be used to generate preference matrices relating the user accounts the content offered by the service provider and specified attributes of the content. The interaction information may include interactions from accounts that are "new" (e.g., were created within a time range less than a threshold time), and can include interactions of the user account with the content (e.g., page views, clicks, taps, voice requests, etc.) and an interaction of the user account with an attribute of the content (e.g., purchased, video watched completely, e-book viewed/listened to entirely). The CMF technique can therefore generate embeddings of user account, content, and attribute information that can be used, in conjunction with a linked account's interaction information, to create a ranked list of content for a new user account.

The techniques described herein can provide various technological advantages over a conventional recommender system. For example, conventional solutions to the cold start problem rely on data about the particular user account. Collaborative filtering typically requires information about the user account to make associations with similar accounts (e.g., clusters of accounts). By contrast, the CMF techniques of the present disclosure can make use of existing account information to obtain recommendations without using specific information of the new account. In doing so, the computer system can maintain privacy restrictions on sensitive account information and/or avoid storing and maintaining the new account information, both improving information security within the computer system and reducing computing costs associated with maintaining unneeded data. Further, providing accurate recommendations can reduce the usage of computing resources of a user device presenting the recommended content by reducing the number of pages and content items displayed before a preferred item is selected. Accurate recommendations from a cold-start of a new user account can also reduce the need for stringent filtering of results and/or the application of rules to content prior to being displayed on a user device. The ranked list of recommended content produced by the CMF-trained ranking model is more likely to contain content that will be approved by an account policy (e.g., a policy that restricts videos that exceed a certain length, a policy that restricts videos but allows books, etc.).

As another example, accurate recommendations produced by the CMF-trained ranking model can promote engagement between the new user account and recommended content. Recommended content that matches the preferences of a new user account can increase the quality of interaction information between the new user account and the service provider computer system, allowing the computer system to gather information for the new user account that can improve a collaborative filtering or other model usable with existing accounts. Poor initial recommendations may result in disengagement from the service provider before the computer system acquires sufficient information to further improve a user experience.

Additionally, the user interface of the user device is improved with accurate recommendations for content and the display of corresponding graphical elements. User devices like mobile phones and tablets typically have small display areas and are therefore constrained with respect to the number of graphical elements that may be displayed on a single page/single screen. By tailoring the content displayed at the graphical user interface, the display area is more efficiently utilized, and the user device can reduce the amount of user input needed during a user account session, resulting in fewer searches, fewer page changes, less scrolling, and correspondingly less traffic between the user device and a server device providing the content. In the cases where the user interface is an audio interface (e.g., a virtual assistant on a smart speaker), responses to a user request for content may be limited by the time needed to present the content options audibly. Improved recommendations of the content can similarly reduce the use of resources by the virtual assistant system to present a long list of content options, reduce clarifying requests from the user and additional voice interactions to select a preferred content item, and correspondingly less traffic between the virtual assistant device and backend services to support the voice interactions.

Additional linked accounts are contemplated. For example, the new account may be a new profile under a group account, which may be used by a friend, roommate, spouse, or other person using the same group account. The new account may also be created based on an invitation to the service provider from an existing account. For example, the online service of a service provider may be a social networking service. The new account can be created by the invited user, with the new account linked to the inviting account. Recommendations for content may be generated from a ranking model that uses qualified interaction information from the inviting account until the new account has generated sufficient interaction information to inform a conventional recommender system.

Turning now to the figures, FIG. 1 is a block diagram and associated flow chart of an example process 100 to generate a ranked list 116 from a ranking model 114 trained using interaction information 118 from a linked account, according to some embodiments. The diagram shows elements of a computer system corresponding to the blocks of the process 100. The process can be performed by a computer system, which can include a server device 102 and a user device 104. Additional details about different computer systems that are capable of performing the techniques of the disclosure are provided below with respect to FIGS. 5 and 8. In some embodiments, the server device 102 can implement the ranking model 114 as part of a recommender system. The recommender system can be a collection of software applications, services, and/or other processes configured to train the ranking model 114 and use the ranking model 114 to generate the ranked list 116. The server device 102 may be a component of a system of a service provider that can provide content (e.g., services, media, items, etc.) to the user device 104, including graphical elements for display at a GUI of the user device 104, voice request responses at a voice interface of the user device 104, and/or network pages of a website of the service provider. The network pages can include content offered by the service provider arranged at a GUI of the user device 104. The service provider may be on online retailer or similar e-commerce provider, a media content provider, a social networking provider, a provider of combinations of similar content.

The process 100 may begin at block 120 with the server device 102 receiving login information for a new user account 106 from the user device 104. The login information may indicate that the new user account is active at the user device 104. The login information may be sent from the user device 104 in response to user input at the user device 104. The server device 102 may receive the login information as part of an initial setup or registration of the new user account (e.g., an initial login to the new user account). In some embodiments, the login information may correspond to the new user account being active within an initial time period after the creation of the new user account.

At block 122, the server device 102 can determine that the new user account 106 has a link 112 to an existing user account 108. The link 112 may be an indication of a relationship between the new user account 106 and the existing user account 108. In some embodiments, the link 112 may provide a one-to-one correspondence between the new user account and the existing user account 108, so that the new user account 106 cannot have a similar link to the user accounts 110 of the service provider. The server device 102 can determine the link 112 explicitly from account information associated with the new user account 106 and/or the existing user account 108. For example, when the new user account 106 is created, the link 112 may be explicitly specified as an account parameter for the new user account 106. In some embodiments, the server device 102 can determine the link 112 implicitly from the account information. For example, the new user account 106 may be a new user profile as a member profile of existing user account 108, so that the link 112 is established explicitly automatically. As another example, the new user account 106 may be created using an invitation from the existing user account 108, so that the new user account 106 has an implicit link 112 to the existing user account 106 that generated the invite.

At block 124, the server device can generate a ranked list 116. The server device 102 can implement the ranking model 114 as part of a recommender system. The ranking model 114 may take interaction information 118 as an input to generate the ranked list 116. The interaction information 118 may be interaction information associated with the existing user account 108. For example, the interaction information 118 can include, without limitation, viewing a content web page (e.g., clicking or tapping on a media item), interacting with the content (e.g., viewing a video, listening to audio media, purchasing an item, etc.), navigating through web pages of the service provider's website or pages on the service provider's application, length of time viewing media or web/application pages (e.g., whether the account watched a video in its entirety, how long a web page is viewed compared to other web pages during a session with the account, etc.), and the like. The server device 102 can use the interaction information 118 to determine preferences for content by the existing user account 108.

At block 126, the server device 102 can send instructions to cause the user device 104 to display content arranged according to the ranked list 116. The content may be displayed at a GUI of the user device 104 generated for the new user account 106. For example, the user device 104 may run an application (e.g., a web browser, a media playing application, a dedicated service provider application, etc.) to interface with the service provider. The content may be displayed as icons, links, or other graphical elements within a page shown at the GUI. The ranked list 116 may order the content according to predicted preference for the new user account 106. For example, the highest ranked content may be displayed first on a page or above other content on a page. In some embodiments, the arrangement of content according to the ranked list 116 may include a portion of the ranked content. For example, the application on the user device 104 may further categorize the content for display. Within a category, the content may be arranged according to the ranked list 116, with only those content items that match the category displayed.

Figure 2:
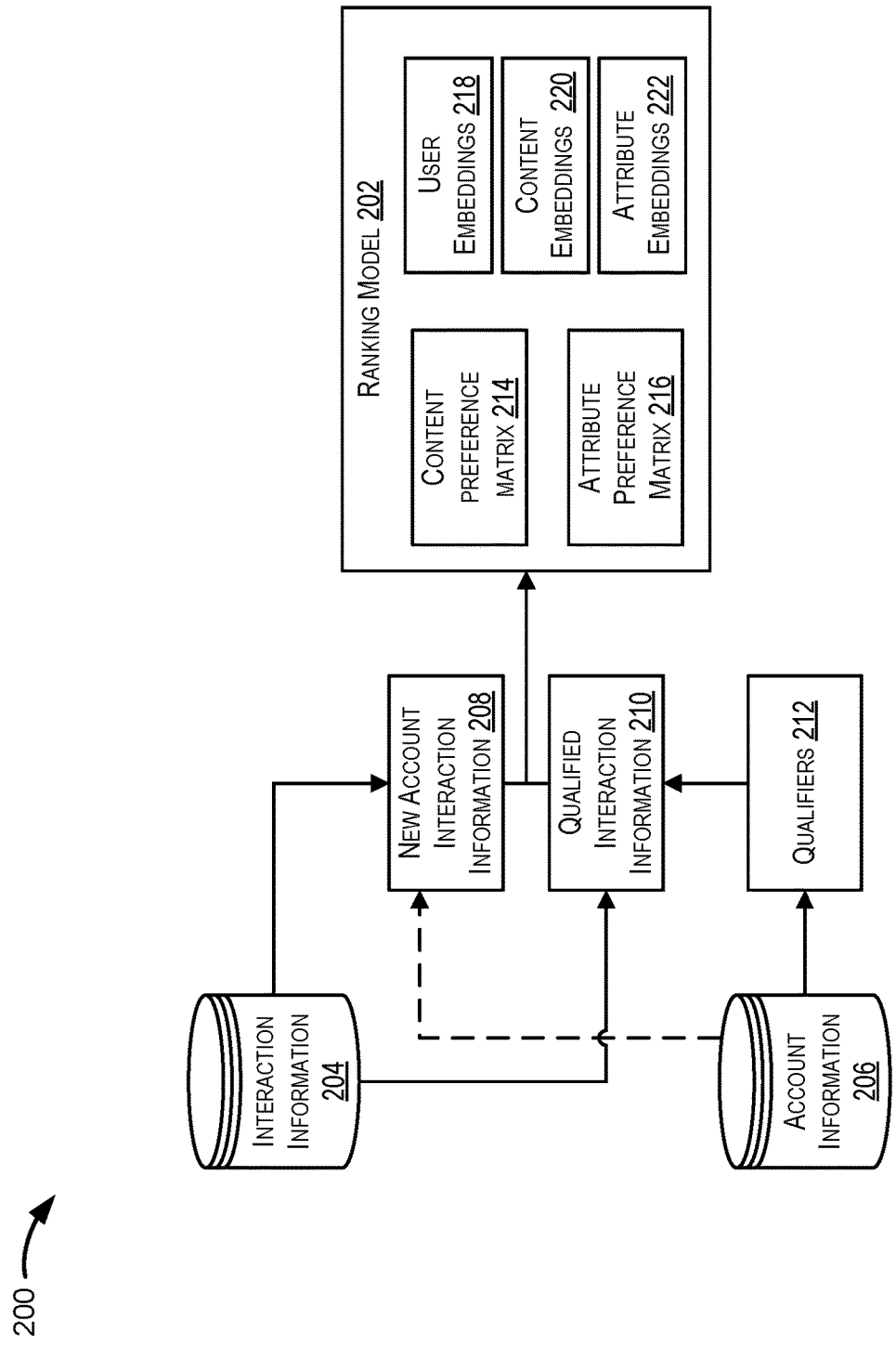
FIG. 2 is a block diagram depicting an example architecture of a computer system for training a ranking model using interaction information from existing accounts, according to some embodiments.

FIG. 2 is a block diagram depicting an example architecture of a computer system 200 for training a ranking model 202 using interaction information 204 from existing accounts, according to some embodiments. The computer system 200 can include the server device 102 and/or user device 104 of FIG. 1. The computer system 200 can be a computer system of an online service provider.

The computer system 200 can include interaction information 204 and account information 206, which may be data stored in one or more data stores, databases, or similar storage. The interaction information 204 may be similar to interaction information 118 of FIG. 1 but can include interaction information for multiple accounts registered with the online service provider. The account information 206 can include data for specifying parameters of the accounts of the service provider. For example, the account information 206 can include account names, account creation dates, login and/or session timestamps, user information (e.g., user name, demographic information, etc.), an account type (e.g., an educational account), tokens associated with the user accounts, and the like. As noted briefly above, some account information 206 (e.g., user identifiable information) may be subject to various privacy restrictions that prevent its use in modeling, including for building associations between one account other accounts for the purposes of collaborative filtering.

The account information 206 can also include qualifiers 212 of the account. The qualifiers 212 can characterize interaction information 204 of one account that may be pertinent to a separate account registered with the service provider. By using the qualifiers 212, the computer system 200 can determine a portion of the interaction information 204 to be qualified interaction information 210. For example, an account for education may correspond to a qualifier characterizing interactions with content categorized as educational. Thus, out of all the interaction information 204 for all user accounts with the service provider, the qualified interaction information 210 may be restricted to interactions (e.g., views, clicks, taps, purchases, web page navigations, voice requests, etc.) of the user accounts that involve educational content (e.g., textbooks, instructional videos, etc.). Other examples of qualifiers include an account content restriction (e.g., qualified interaction information can exclude interactions with content that exceed the content restriction).

The computer system 200 can also use account information 206 to identify interaction information 204 that was generated within a time range of a user account's creation. This new account interaction information 208 can then represent interactions with content that the user account performed when it was newly created with the service provider. The new account interaction information 208 may then be usable The ranking model 202 can be a predictive model that can be trained using the new interaction information 208 and the qualified interaction information 210 of various accounts of the service provider. Training the ranking model 202 can include generating a content preference matrix 214 and an attribute preference matrix 216. Mathematically, the content preference matrix 214 may be represented as $p_{ui}^{cont}$, which may be values representing the preference of user account u to content i. As an example, the service provider may be an online retailer and the content an item available for purchase, so $p_{ui}^{cont}$ is a value indicating that user account u has expressed a preference for the item. The preference may be indicated from the interaction information 204 by the item being viewed during a session of the user account (e.g., a user clicks on the item after searching for related items). The preference may also be indicated from other interaction information 204, including browsing history of the user account (e.g., multiple views of the same content in a session of the user account, time spent on the content page).

In some embodiments, the values of $p_{ui}^{cont}$ may be binary (i.e., 0 or 1), with a value of 0 indicating that the user account u has no recorded interaction with content i, and a value of 1 indicating that the user account u has any interaction with content i. The computer system 200 may also generate a confidence value $c_{ui}^{cont}$, which can quantify the strength of indication of the "1" values in the $p_{ui}^{cont}$ matrix. A larger value of $c_{ui}^{cont}$ is a stronger indication that the user account u prefers content i. For example, the interaction information 204 includes multiple page views of the content across multiple different sessions of the user account, indicating a higher confidence value). The $p_{ui}^{cont}$ matrix may then be a sparse matrix associating each user account (or each user account represented in new account interaction information 208 and/or qualified interaction information 210) of a service provider with each content item offered by the service provider.

Similarly, the attribute preference matrix 216 may be represented as $p_{ua}^{attr}$, which may be values representing the preference of user account u to attribute a. An attribute can include, for example, a user account purchasing a content item (e.g., purchasing an item from an online retailer). Attributes can also include a user account watching the entirety of a video content item, reading the entirety of an e-book, or similar parameters. As with $p_{ui}^{cont}$, $p_{ua}^{attr}$ may be binary, forming a sparse matrix relating associating each user account (or each user account represented in new account interaction information 208 and/or qualified interaction information 210) of the service provider to the attributes (e.g., item purchases). A confidence value $c_{ua}^{attr}$, may be generated that can quantify the strength of the indication of the "1" values in the $p_{ua}^{attr}$ matrix.

Once the content preference matrix 214 and the attribute preference matrix 216 have been generated, the computer system 200 can continue to train the ranking model 202 by generating embeddings that capture the user account information (e.g., user embeddings 218), the content information (e.g., content embeddings 220), and the attribute information (e.g., attribute embeddings). Mathematically, the user embeddings 218 may be represented as $x_u$, the content embeddings 220 as $y_i$, and the attribute embeddings 222 as $z_a$. To generate the embeddings, the computer system 200 can input the content preference matrix 214 and the attribute preference matrix 216 into an objective function. In an embodiment, the objective function can be expressed as shown below in equation (1):

$$\min_{x,y,z} \sum_{u,i} c_{ui}^{cont} \left( p_{ui}^{cont} - x_u^T y_i \right)^2 + \quad (1)$$

$$w_{attr} \sum_{u,i} c_{ua}^{attr} \left( p_{ua}^{attr} - x_u^T z_a \right)^2 + \lambda \left( \sum_u \|x_u\|^2 + \sum_i \|y_i\|^2 + \sum_a \|z_a\|^2 \right)$$

The factor $w_{attr}$ represents a weight for the attribute embedding term, while the factor $\lambda$ is a tunable parameter for the regularization term. Solving equation (1) represents collectively factoring the content preference matrix 214 and the attribute preference matrix 216 into the desired embeddings, with the user embedding 218 ($x_u$) shared between each error term. The objective function in equation (1) may be optimized using an alternating least squares method, where the values of $x_u$ are first fixed to obtain an estimate for $y_i$ and $z_a$, and then alternately $y_i$ and $z_a$ are fixed to obtain an estimate for $x_u$, with the steps repeating until a desired convergence. Although equation (1) depicts the loss functions as squared error terms, one skilled in the art would recognize other loss functions that could be used.

As additional interaction information 204 is gathered by the computer system 200, the ranking model 202 may be retrained by using the additional interaction information 204 to generate an updated content preference matrix and an updated attribute preference matrix 216 and recomputing the embeddings. The ranking model 202 can be retrained on a set schedule (e.g., nightly).

Figure 3:
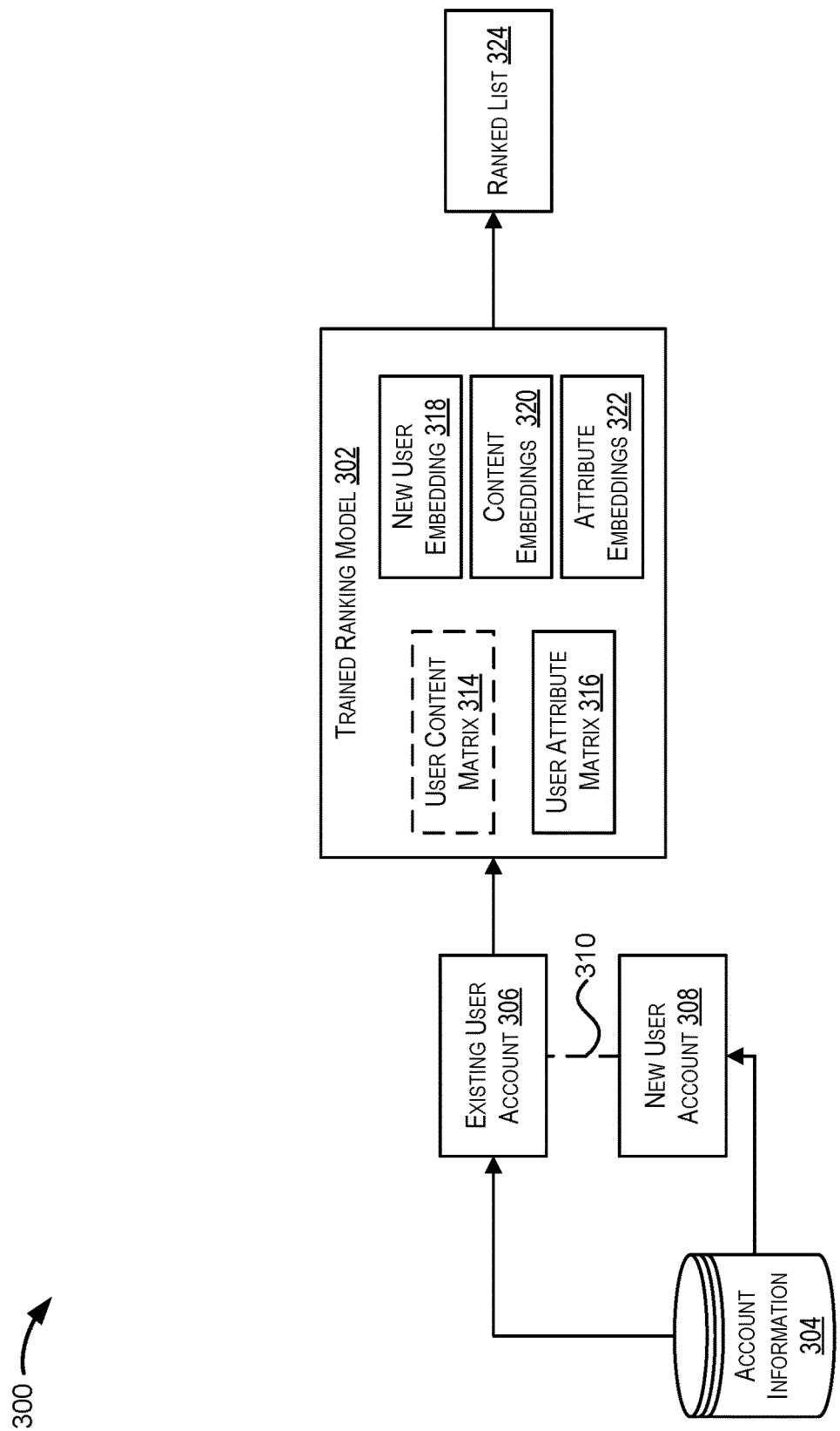
FIG. 3 is another block diagram depicting an example architecture of a computer system for generating a ranked list of content using a trained ranking model, according to some embodiments.

FIG. 3 is another block diagram depicting an example architecture of a computer system 300 for generating a ranked list 324 of content using a trained ranking model 302, according to some embodiments. The computer system 300 may be similar to the computer system 200 described above with respect to FIG. 2. The trained ranking model 302 may be the ranking model 202 of FIG. 2 of training according to the techniques described herein, with content preference matrix 314 and attribute preference matrix 316 similar to content preference matrix 214 attribute preference matrix 216, respectively, and content embeddings 320 and attribute embeddings 322 similar to content embeddings 220 and attribute embeddings 222, respectively.

The computer system 300 can receive information corresponding to the creation of a new user account 308. The new user account 308 may be stored at the computer system 300 with the account information 304, which may be similar to account information 206 described above with respect to FIG. 3. The computer system 300 may receive login information from a user device (e.g., user device 104 of FIG. 1) corresponding to the new user account 308 being active at the user device. In response the computer system 300 can determine a link 310 between the new user account 308 and an existing user account 306. The computer system 300 can then use the existing user account 306 to determine interaction information corresponding to the existing user account 306. The interaction information can serve as a proxy in the model to compute a new user embedding 318 corresponding to the new user account 308.

The computer system can compute the new user embedding 318 by solving an objective function as shown below in equation (2):

$$\min_x \sum_{u,i} c_{ua}^{attr} \left( p_{ua}^{attr} - x_u^T, z_a \right)^2 + \lambda \sum_u \|x_{u'}\|^2 \quad (2)$$

Optimizing equation 2 can be done using alternating least squares methods. The factor $x_u$, represents the embedding for new user u as computed using preference and confidence values for the existing user.

Once the new user embedding 318 is computed, the computer system 300 can generate the ranked list 324 by computing a product of the new user embedding 318 with the content embeddings 320. Content with the highest values from the product can correspond to the predicted preferred content for the new user account 308. The ranked list 324 can include a limited portion of all the content offered by the service provider. For example, the ranked list 324 can include the top 50 content items ranked according to the product computed with the new user embedding 318 and the content embeddings 320.

Figure 4:
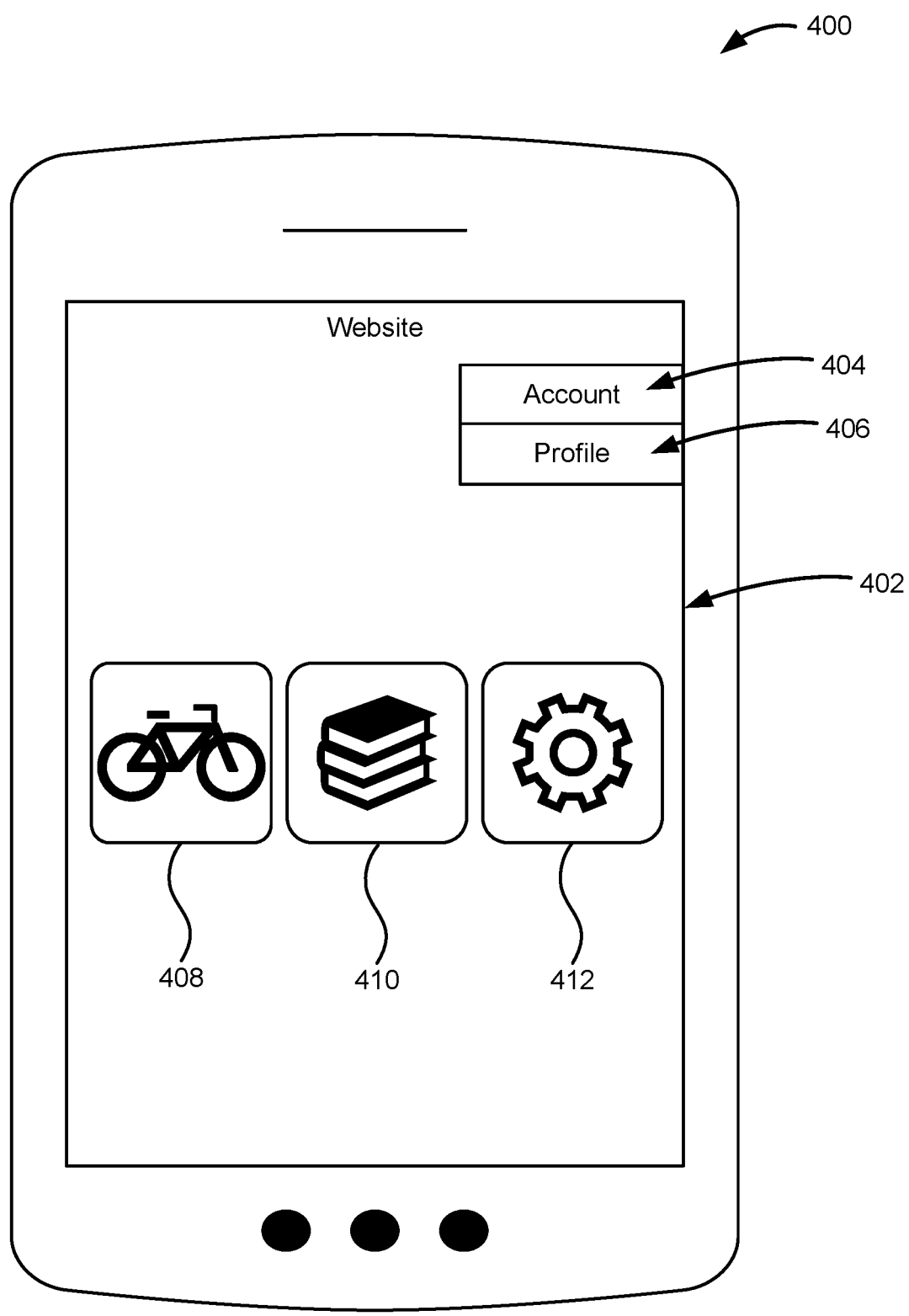
FIG. 4 is a diagram illustrating a user device displaying content at a graphical user interface of the user device arranged according to a ranked list, according to some embodiments.

FIG. 4 is a diagram illustrating a user device 400 displaying content at a GUI 402 of a user device arranged according to a ranked list, according to some embodiments. As described herein, user device 400 may be an example of user device 104 of FIG. 1. The web page (or information used to generate the web page) may be sent to user device 400 from a server device (e.g., server device 102 of FIG. 1). The content can correspond to graphical elements (e.g., icons, links, buttons) presented at the GUI 402.

The graphical elements can be displayed at the GUI 402 of the user device. The GUI 402 may be generated by an application executing on the user device 400, including a web browser application or a dedicated application for accessing online resources of the service provider. As an example, the graphical elements can be part of a home screen or content screen within the dedicated application executing at the user device 400. In another example, the graphical elements may be displayed as part of a network page presented in a web browser application. The GUI 402 can display information corresponding to the user account interacting with the service provider. As depicted in FIG. 4, a profile 406 may be active under an account 404. The profile 406 can be a new user profile, so that the service provider does not have interaction information for the profile that is usable to generate content recommendations. The account 404 may be an existing account registered with the service provider, so that the service provider does have interaction information for the account 404 and/or other profiles under the account 404. A user can interact with the GUI 402 to login to the profile 406. The login information can be sent from the user device 400 to a server device. In response, the server device can generate and send a ranked list of content (e.g., ranked list 324 of FIG. 3) to the user device 400 for display at the GUI 402.

The ranked list of content can include graphical elements (e.g., icons, pictures, links, etc.) for content offered by the service provider. For example, the content can include a graphical element for a bicycle 408 offered for sale by the service provider, a graphical element for a book 410 offered for sale by the service provider, and a graphical element for an application 412 offered for download from the service provider. These graphical elements may be arranged in the GUI 402 according to the ranked list. For example, the ranking of the bicycle 408 may be higher than the ranking of the book 410.

In some embodiments, the content displayed at the GUI 402 can be arranged according to predefined categories. For example, a first row of content graphical elements can represent a portion of the content offered by the service provider and arranged according to popularity of the content determined from existing user accounts with the service provider. A second row of content graphical elements can then represent a portion of the content graphical elements displayed in the first row but arranged according to the ranked list.

In some embodiments, the content displayed at the GUI 402 may be filtered according to information associated with profile 406 and/or account 404. For example, the server device can generate a ranked list that includes the bicycle 408, the book 410, the application 412, and a video. The video may be more highly ranked than the book 410 and the application 412. However, the profile 406 may have a content restriction or other parameter that prevents the video from being displayed at the GUI. Accordingly, the user device 400 may not display the video but may display the other content graphical elements.

Although FIG. 4 depicts the user device 400 as displaying content on the GUI 402 according to the ranked list, user device 400 may also have other user interfaces through which content can be presented to a user, including audio or voice interfaces (e.g., via a virtual assistant).

Figure 5:
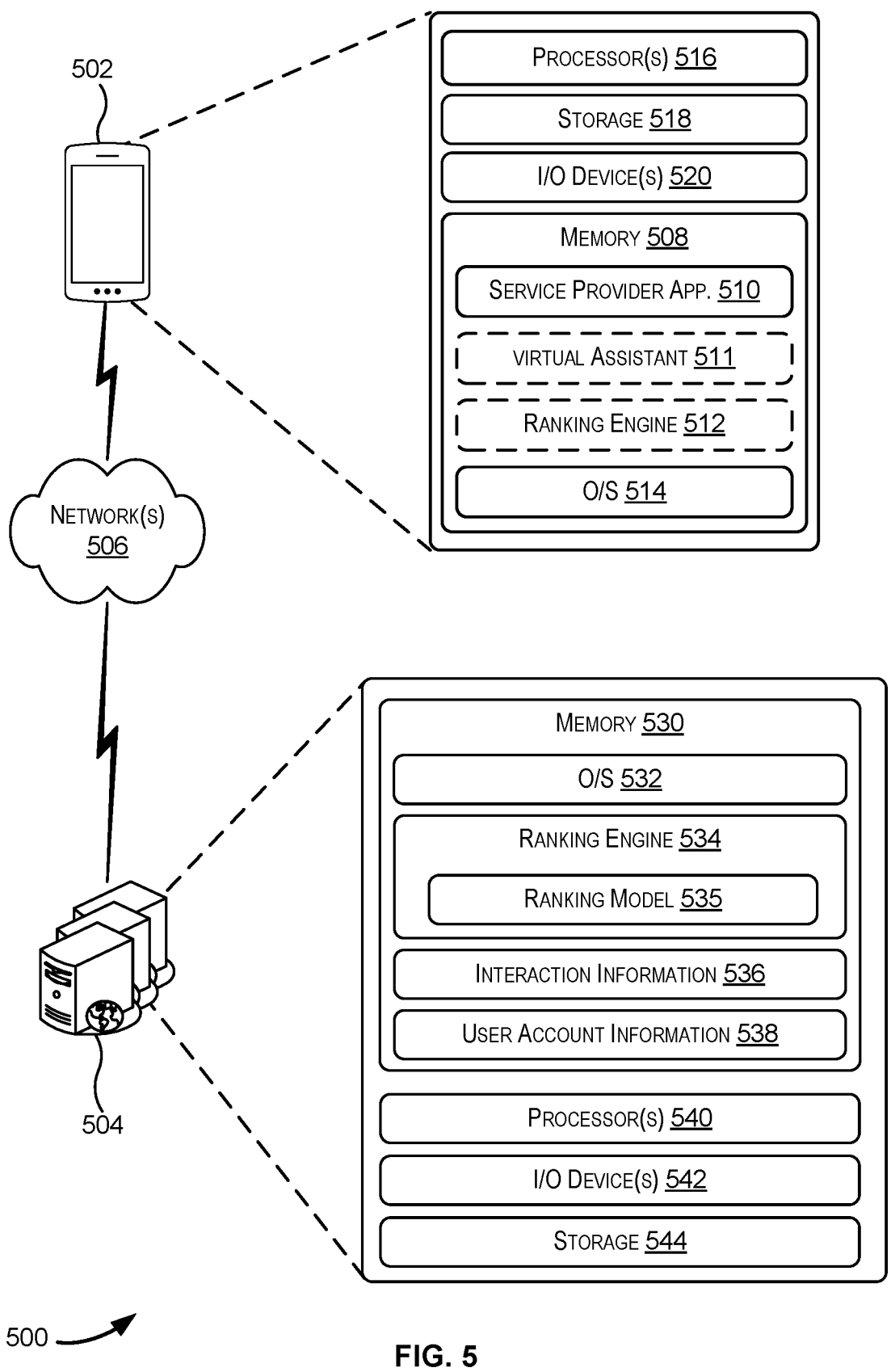
FIG. 5 is a block diagram depicting an example architecture of a computer system, including a plurality of modules that may perform functions in accordance with at least one embodiment.

FIG. 5 is a block diagram depicting an example architecture of a computer system 500, including a plurality of modules that may perform functions in accordance with at least one embodiment. The system includes a user device 502 (e.g., a tablet, a mobile device, a smart phone, or other suitable computing device), a server device 504, and one or more network(s) 506. The server device 504 can be a server device or one or more remote computing devices, including cloud device, and may host ranking model 534, interaction information 536, and user account information 538, which may in turn be an example of other similarly named components described herein, including ranking model 202, interaction information 204, and account information 206 of FIG. 2, respectively. The network(s) 506 may include any one or a combination of many different types of networks, such as cable networks, the Internet, wireless networks, cellular networks, and other private and/or public networks.

As described herein, the user device 502 can have at least one memory 508, one or more processing units (or processor(s)) 516, and one or more input/output ("I/O") device(s) 520. The processor(s) 516 may be implemented as appropriate in hardware, computer-executable instructions, firmware, or combinations thereof. Computer-executable instruction or firmware implementations of the processor(s) 516 may include computer-executable or machine executable instructions written in any suitable programming language to perform the various functions described. The I/O device(s) 520 can include displays, monitors, touch screens, mouse, keyboard, microphones, speakers, or other I/O device.

The memory 508 may store program instructions that are loadable and executable on the processor(s) 516, as well as data generated during the execution of these programs, login information, account information, interaction information, and the like. Depending on the configuration and type of user device 502, the memory 508 may be volatile (such as random access memory ("RAM")) or non-volatile (such as read-only memory ("ROM"), flash memory, etc.). In some implementations, the memory 508 may include multiple different types of memory, such as static random access memory ("SRAM"), dynamic random access memory ("DRAM") or ROM. The user device 502 may also include additional storage 518, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the storage 518 may be utilized to store data contents received from one or more other devices (e.g., server device 504). For example, the storage 518 may store web pages, web page content, application pages, or application data generated by the server device 504 and sent to the user device 502 to display content from a service provider to be displayed according to a ranked list.

The memory 508 may include an operating system (O/S) 514 and one or more application programs, modules, or services for implementing the features disclosed herein, including a service provider application 510. The service provider application 510 may be configured to interface with one or more components of a service provider's computer system (e.g., server device 504) to send requests for application pages for a website of the service provider, content from the service provider, and/or graphical elements corresponding to the content. The service provider application 510 may, in some embodiments, be an application associated with the service provider (e.g., video media player application for a video content provider, a store application for an online retailer, etc.) configured to receive content from the server device 504, including application page data, media content, graphical elements, and the like. The application pages and/or graphical elements may be presented at one of the I/O device(s) 520 (e.g., a display). The service provider application 510 may receive user input and generate login information as well as data corresponding to interactions with content of the web application 510 received via a GUI.

In some embodiments, the user device 502 can include a voice assistant 511 that can be configured to provide an audio user interface in conjunction with speakers and microphones of the I/O device(s) 520. The voice assistant 511 can receive voice requests from a user and present voice responses to the voice requests. For example, a new user may request a list of songs that are available to played at the user device 502. The voice assistant 511 can parse the request and receive, from the server device 504, a ranked list of available songs that may be preferred by the new user in accordance with the ranking model described herein. The voice assistant 511 can then present the ranked list of content to the user, for instance by reciting the available songs in order according to the ranked list.

Turning now to server device 504 in more detail, the server device 504 can be any suitable type of computing device including, but not limited to, a laptop computer, a desktop computer, a mobile phone, a smartphone, a server computer, etc. In some embodiments, the server device 504 is executed by one or more virtual machines implemented within a cloud computing or other hosted environment. The cloud computing environment may include provisioned computing resources like computing, storage, and networking. The server device 504 can communicate with the user device 502 via the network(s) 506 or other network connections. The server device 504 may be configured to implement the functionality described herein as part of a distributed computing environment.

The server device 504 can include a memory 530, one or more processor(s) 540, I/O devices 542, and at least one storage unit 544. As with the processor(s) 516 of user device 502, the processor(s) 540 may be implemented as appropriate in hardware, computer-executable instructions, software, firmware, or combinations thereof. Computer-executable instruction, software, or firmware implementations of the processor(s) 540 may include computer-executable or machine-executable instructions written in any suitable programming language to perform the various functions described. The memory 530 may store program instructions that are loadable and executable on the processor(s) 540, as well as data generated during the execution of these programs. Depending on the configuration and type of memory included in the server device 504, the memory 530 may be volatile (such as RAM) and/or non-volatile (such as read-only memory ("ROM"), flash memory, or other memory). In some embodiments, the storage 544 may include one or more databases, data structures, data stores, or the like for storing and/or retaining information associated with the server device 504 or the user device 502. The storage 544 may include interaction information and account information for accounts registered with the service provider.

The memory 530 may include an operating system (O/S) 532 and one or more application programs, modules, or services for implementing the features disclosed herein, including ranking engine 534, interaction information 536, and user account information 538. The interaction information 536 and the account information 538 may be obtained from storage 544 as needed to perform the operations described herein. The ranking engine 534 may be configured to generate, using a ranking model (e.g., ranking model 302 of FIG. 3), a ranked list of content offered by the service provider. The ranking model 535 may take as an input interaction information 536 corresponding to an existing user account (e.g., existing user account 306 of FIG. 3) linked to a new user account (e.g., new user account 308 of FIG. 3). The ranking engine 534 may also be configured to train the ranking model using interaction information 536 and user account information 538 (including qualified interaction information and new account interaction information).

In some embodiments, some, any, all, or various combinations of the functionality described above with respect to the server device can be performed on the user device 502. For example, the user device 502 can implement a ranking engine 512 that can be configured to perform operations similar to those described above with respect to ranking engine 534 and/or systems implementing a ranking model described herein. For example, the ranking model 535 may be trained by server device 504, with the trained model sent to user device 502 for use to compute the ranked list of content.

Figure 6:
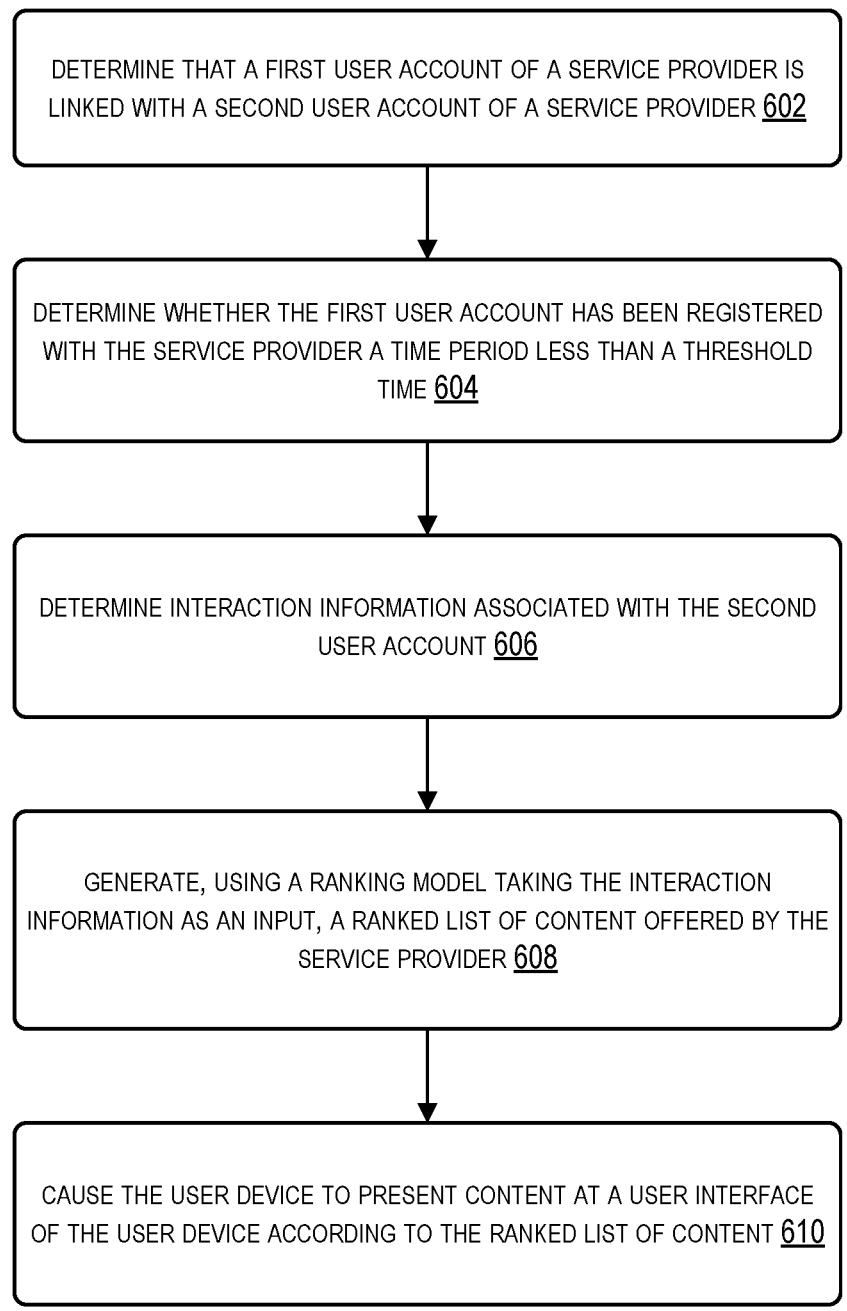
FIG. 6 is a simplified flow diagram of an example process for determining a link between a first user account and a second user account, obtaining interaction information for the second user account, and using a ranking model with the interaction information to generate a ranked list of content for the first user account, according to some embodiments.

FIG. 6 is a simplified flow diagram of an example process 600 for determining a link between a first user account and a second user account, obtaining interaction information for the second user account, and using a ranking model with the interaction information to generate a ranked list of content for the first user account, according to some embodiments. The process 600 may be performed by one or more components of a computer system of a service provider (e.g., user device 502 and server device 504 of FIG. 5). The process 600 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Some or all of the process 600 (or any other processes and/or methods described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 600 may begin at block 602 when a server device of a service provider computer system determines that a first user account of the service provider is linked with a second user account of the service provider. The first user account may be a new user account, while the second user account may be an existing user account. Determining that the first user account is linked with the second user account can include determining an explicit indication that the accounts are linked. For example, when the first user account is created, the first user account can explicitly be linked (e.g., via user input) with the second user account. In some embodiments, determining that the first user account is linked with the second user account can include determining an implicit indication that the accounts are linked. The implicit indication can include the first user account created as a profile under the second user account. The implicit indication can also include that the first user account was created after an invitation from the second user account.

At block 604, the server device can determine whether the first user account has been registered with the service provider for a time period less than a threshold time. For example, the threshold time can be 10 days, so that the server device can determine that the first user account is a newly registered account by determining that the first user account was registered within the previous 10 days. The age of the first user account (e.g., a timestamp corresponding to the account creation) can be stored as part of the account information for the first user account.

If the first user account has been registered with the service provider for less than the threshold time (e.g., the first user account is relatively new to the service provider), the server device can, in response, determine interaction information associated with the second user account, at block 606. The interaction information can include information related to various interactions between the second user account and the service provider, including page visits, navigation history, content views, time spent in account sessions, interactions with content offered by the service provider, product purchases, and the like.

In some embodiments, determining the interaction information can include determining a qualifier associated with the second user account. The qualifier can be a parameter or other data of the account information for the second user account that is associated with an account type of the first user account. For example, the qualifier can indicate that the first user account is an educational account. The qualifier can also characterize a content category offered by the service provider. For example, the content category can be educational texts or instructional videos. Using the qualifier, the server device can determine qualified interaction information associated with the second user account. For example, if the qualifier indicates that the first user account is an educational account, the qualified interaction information from the second user account can correspond to interactions with educational content from the service provider (e.g., searches for instructional videos, textbooks, etc.). In some embodiments, the qualifiers may be predefined based on the account type of the first user account. The server device can determine the qualifiers by selecting the predefined qualifiers associated with the account type.

At block 608, the server device can generate a ranked list of content offered by the service provider. The ranked list can be generated using the qualified interaction information as input into a ranking model that has been trained to predict a preference for content by the first user account. The trained model can include embeddings representing user account information, content information, and attribute information that can be used to estimate preferences between user accounts and content. The server device can use the trained ranking model to compute a new user embedding corresponding to the first user account. The server device can then compute a product of the new user embedding and the content embedding from the trained ranking model to generate ranking values for each content item offered by the service provider. In some embodiments, the content of the ranked list may be different than the content associated with the interaction information from the second user account. For example, the interaction information can include interactions with books offered by the service provider, while the ranked list can include videos offered by the service provider.

At block 610, the server device can cause the user device to present content at a user interface (e.g., a GUI, an audio interface) of the user device according to the ranked list. The content (e.g., graphical elements, links, other objects representing the content, recitation of content by a virtual assistant, etc.) may be arranged so that higher ranked content is presented first (e.g., displayed at the top of a web page, on a first page of results, recited first, etc.) than lower ranked content. In some embodiments, the content may be arranged according to categories, so that only a portion of the content displayed is arranged according to the ranked list. For example, the content may be displayed in a first row according to a popularity rating, and a portion of the content identified by popularity may be displayed in a second row according to the ranked list. In some embodiments, the content may be presented at an audio interface via a virtual assistant. For example, the virtual assistant may recite the names/titles of content items in order according to the ranked list via a speaker of the user device.

In some embodiments, prior to causing the user device to present the content according to the ranked list, the server device can determine restrictions associated with the first user account. For example, the first user account can be restricted from viewing toys or other retail items for sale. If the ranked list contains content that includes the restricted items, the server device can remove the content from the ranked list according to the restrictions.

Figure 7:
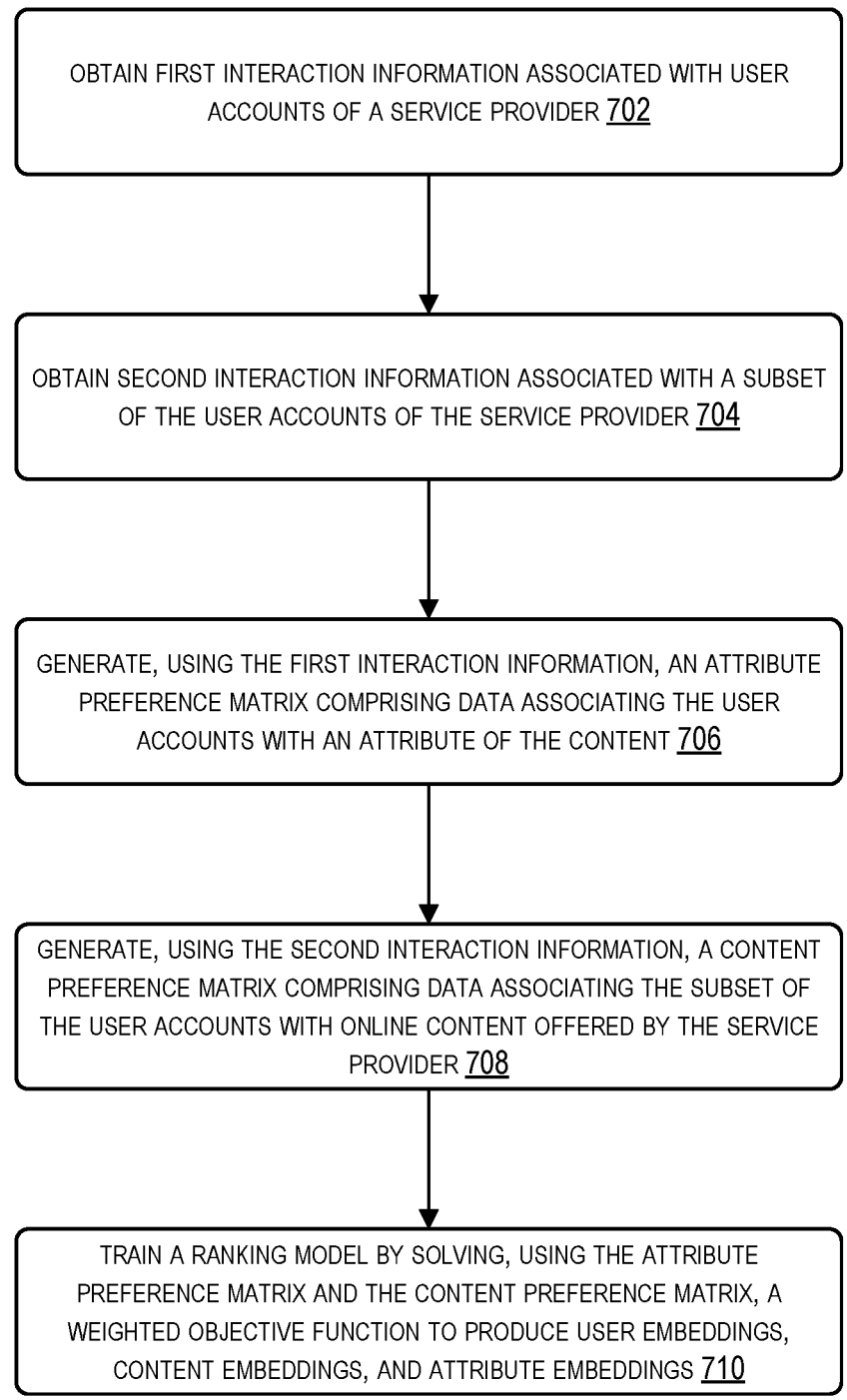
FIG. 7 is another simplified flow diagram of an example process for training a ranking model, according to some embodiments.

FIG. 7 is another simplified flow diagram of an example process 700 for training a ranking model, according to some embodiments. As with process 600 of FIG. 6, process 700 may be performed by one or more components of a computer system of a service provider (e.g., user device 502 and server device 504 of FIG. 5).

The process 700 can begin at block 702 with the server device obtaining first interaction information associated with user accounts of the service provider. The user account can include some or all of the existing accounts of the service provider. In some embodiments, obtaining the first interaction information can correspond to interactions with online content offered by the service provider. At block 704, the server device can obtain second interaction information associated with a subset of the user accounts. In some embodiments, the second interaction information can include interaction information generated within a time range from the creation of each user account of the subset of the user accounts. For example, the second interaction information can include the interactions with content for the accounts when the accounts were new and therefore similar to a new user account.

At block 706, the server device can generate an attribute preference matrix (e.g., attribute preference matrix 216 of FIG. 2) that includes data associating the user accounts with an attribute of the content. The attribute preference matrix can be generated using the first interaction information. The attribute can include, for example, a user account purchasing a content item (e.g., purchasing an item from an online retailer). Attributes can also include a user account watching the entirety of a video content item, reading the entirety of an e-book, or similar parameters.

At block 708, the server device can generate a content preference matrix (e.g., content preference matrix 214 of FIG. 2) that includes data associating the subset of the user accounts with online content offered by the service provider.

At block 710, the server device can train the ranking model by solving a weighted objective function (e.g., equation (1)) to produce user embeddings (user embeddings 218 of FIG. 2), content embeddings (content embeddings 220 of FIG. 2), and attribute embeddings (e.g., attribute embeddings 222 of FIG. 2). In some embodiments, the weighted objective function can be solved using an alternating least squares method.

In some embodiments, the server device can receive additional interaction information corresponding to a new user account. For example, a new user account can begin to interact with the service provider by navigating the service provider's application via a GUI, viewing content, and so on. This additional interaction data can be used by the server device to generate an updated content preference matrix. The server device can then use the updated content preference matrix to retrain the ranking model (e.g., according to the operations described above with respect to FIG. 3). In this way, the new user account information may be incorporated into the trained ranking model as the new user begins to produce interaction information, but before the server device has enough information to use a collaborative filtering model directly with the new user account.

In some embodiments, the server device can receive additional interaction information corresponding to navigation history of the user accounts with a website of the service provider. The server device can then generate an updated attribute preference matrix and retrain the ranking model by solving, using the updated attribute preference matrix, the weighted objective function. In this way, the ranking model can be updated continually using new interaction information generated by existing user accounts.

Figure 8:
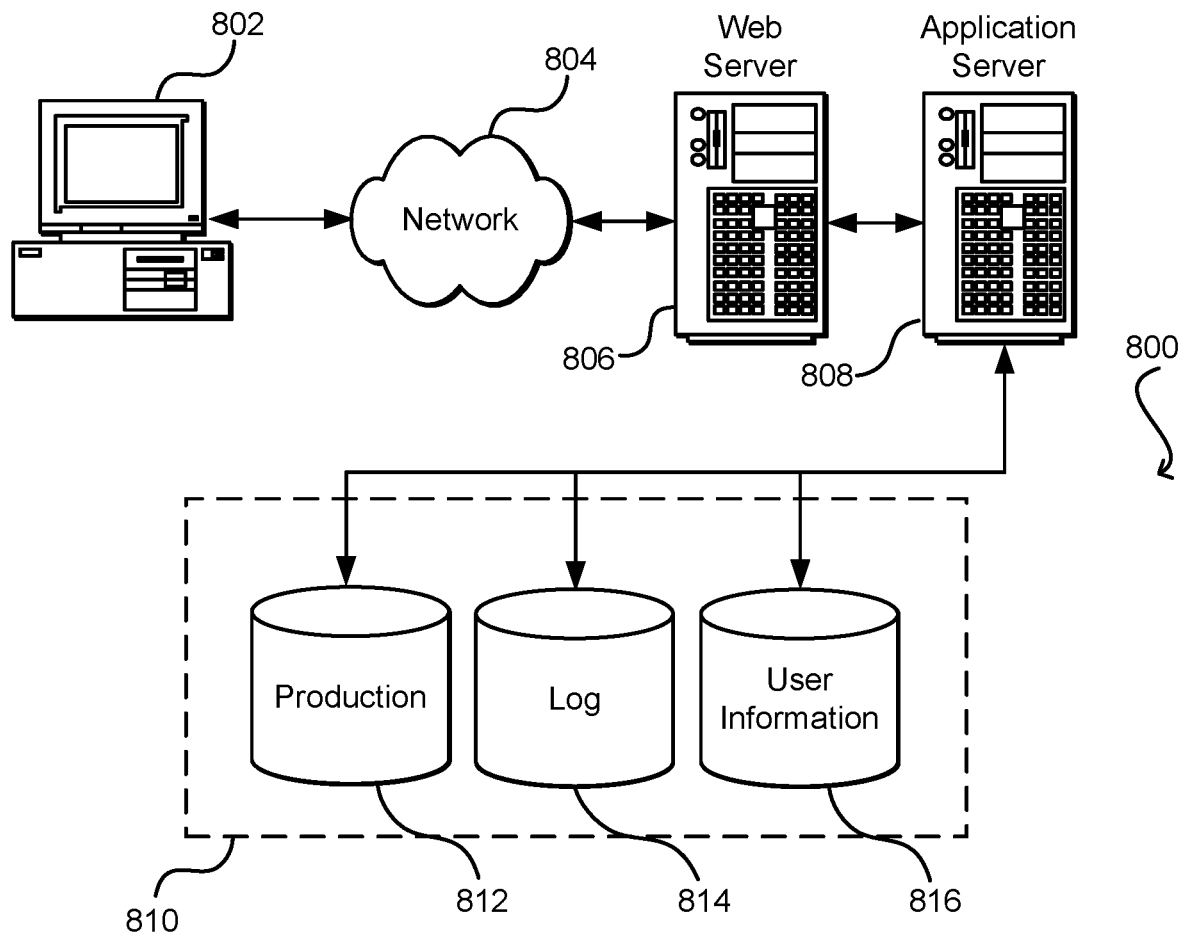
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

In some examples, cell phones (or, more broadly, mobile phones) may be one specific type of mobile device that is an example of the electronic client device 802. In some instances, a user's mobile device may be considered their primary client device. Other example mobile devices include wearables, such as watches, worn sensors (e.g., rings, bracelets, etc.), cameras, eyeglasses, and the like, which may be considered "connected" auxiliary devices. In some examples, the combination of a user's primary mobile device and all or some of their connected, auxiliary devices, may make up a single mobile system configured to communicate with the Web server 806 or other servers over the network 804 or other networks.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of Hypertext Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update, or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle©, Microsoft*, Sybase*, and IBM©.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

Certain embodiments of the present disclosure may involve storing and using interaction data associated with a person or device (e.g., user data or device data). Storage and/or use of such interaction data may be controlled by a user using privacy controls associated with a device and/or a companion application associated with a device. Accordingly, users may opt out of storage of interaction data and/or may select particular types of interaction data that may be stored while preventing aggregation and storage of other types of interaction data. Additionally, aggregation, storage, and use of interaction data, as described herein, may be compliant with privacy controls, even if not technically subject to them, to bolster user trust. For example, interaction and other data described herein may be treated as if it fell under acts and regulations, such as the Health Insurance Portability and Accountability Act (HIPAA) and the General Data Protection Regulation (GDPR), even if it does not actually fall under these acts and regulations.

What is claimed is:

1. A computer system of a service provider comprising:
   one or more processors; and
   one or more memories storing instructions that, when executed by the one or morm processors, cause the computer system to:
   receive, from a user device, login information to a new user account associated with an online service of a service provider, the login information input via a graphical user interface presented at the user device;
   determine that the new user account is linked with an existing user account of the service provider;
   determine interaction information associated with the existing user account and corresponding to the online service of the service provider, wherein the interaction information includes first information corresponding to use to be attributed to the new user account mixed with second information corresponding to use to be attributed to the existing user account;
   determine a qualifier associated with the new user account, the qualifier characterizing a service category of the online service, the service category being accessible to the new user account;
   determine, using the qualifier and the interaction information, qualified interaction information associated with the new user account, the qualified interaction information comprising a portion of the first information based on the service category;

generate, using a ranking model taking the qualified interaction information as an input and independently of the second information corresponding to use to be attributed to the existing user account, a ranked list of the online services offered by the service provider, the ranking model trained to predict user preferences for the services; and responsive to detecting that the new user account is active at the user device, cause the user device to present content at the graphical user interface according to the ranked list, the content comprising graphical elements displayed at the graphical user interface.

2. The computer system of claim 1, wherein the ranking model is trained using a collective matrix factorization taking as inputs additional interaction information corresponding to user accounts of the service provider, the additional interaction information comprising interactions with online services offered by the service provider by additional existing user accounts and device interactions with an application associated with the service provider by additional new user accounts.

3. The computer system of claim 1, further comprising additional instructions that, when executed by the one or more processors, cause the computer system to:
    determine whether the new user account was created within a predefined time period; and
    responsive to a determination that the new user account was created within the predefined time period, determine the interaction information associated with the existing user account.

4. The computer system of claim 1, wherein the qualifier comprises an account restriction associated with the new user account; a type of the new user account; or a specified content type.

5. A method implemented by a computer system, the method comprising:
    determining that a first user account associated with a service provider is linked with a second user account associated with the service provider;
    determining whether the first user account has been registered with the service provider a time period less than a threshold time;
    responsive to the determination that the first user account has been registered for the time period less than the threshold time, determining interaction information associated with the second user account, wherein the interaction information includes first information corresponding to use to be attributed to the first user account mixed with second information corresponding to use to be attributed to the second user account, the interaction information determined by at least:
        determining a qualifier associated with the first user account, the qualifier characterizing a content category offered by the service provider and being accessible to the first user account; and
        determining, using the qualifier, qualified interaction information associated with the first user account, the qualified interaction information comprising a portion of the first information based on second user account interactions with content of the content category;
    generating, using a ranking model taking the qualified interaction information as an input and independently of the second information corresponding to use to be attributed to the second user account, a ranked list of content supported by an online service of the service provider, the ranking model trained to predict a preference for the online service; and
    responsive to detecting that the first user account is active at a user device, causing the user device to present content at a user interface of the user device according to the ranked list of content.

6. The method of claim 5, wherein determining the interaction information further comprises determining second user account interactions with the content supported by the online service of the service provider.

7. The method of claim 5, wherein determining the qualifier comprises:
    determining an account type for the first user account; and
    selecting a predefined qualifier associated with the account type.

8. The method of claim 5, wherein determining that the first user account is linked with the second user account comprises identifying that a user profile was created in the second user account.

9. The method of claim 5, further comprising:
    determining restrictions associated with the first user account; and
    prior to causing the user device to display the ranked list of content, removing content from the ranked list of content according to the restrictions.

10. The method of claim 5, wherein generating the ranked list of content comprises generating a ranked list of items different from content associated with the interaction information.

11. The method of claim 5, wherein the user interface is an audio interface of a virtual assistant service, and wherein causing the user device to present content at a user interface comprises causing the virtual assistant service to present content via the audio interface.

12. The method of claim 5, wherein determining the qualifier associated with the first user account comprises determining that the qualifier indicates that the first user account is an educational account.

13. The method of claim 5, wherein determining the qualifier associated with the first user account comprises determining the qualifier associated with a content restriction of the first user account.

14. A non-transitory computer-readable medium storing instructions that, when executed by one or more processors of a computer system, cause the computer system to perform operations comprising:
    determining that a first user account associated with a service provider is linked with a second user account associated with the service provider;
    determining whether the first user account has been registered with the service provider a time period less than a threshold time;
    responsive to the determination that the first user account has been registered for the time period less than the threshold time, determining interaction information associated with the second user account, wherein the interaction information includes first information corresponding to use to be attributed to the first user account mixed with second information corresponding to use to be attributed to the second user account, the interaction information determined by at least:
        determining a qualifier associated with the first user account, the qualifier characterizing a content category offered by the service provider and being accessible to the first user account; and
        determining, using the qualifier, qualified interaction information associated with the first user account, the qualified interaction information comprising a portion of the first information based on second user account interactions with content of the content category;

generating, using a ranking model taking the qualified interaction information as an input and independently of the second information corresponding to use to be attributed to the second user account, a ranked list of content supported by an online service of the service provider, the ranking model trained to predict a preference for the online service; and responsive to detecting that the first user account is active at a user device, causing the user device to present content at a user interface of the user device according to the ranked list of content.

15. The non-transitory computer-readable medium of claim 14, wherein determining the interaction information further comprises determining second user account interactions with the content supported by the online service of the service provider.

16. The non-transitory computer-readable medium of claim 14, wherein determining the qualifier comprises:
determining an account type for the first user account; and
selecting a predefined qualifier associated with the account type.

17. The non-transitory computer-readable medium of claim 14, wherein determining that the first user account is linked with the second user account comprises identifying that a user profile was created in the second user account.

18. The non-transitory computer-readable medium of claim 14, storing additional instructions that, when executed by the one or more processors, cause the computer system to perform further operations comprising:
determining restrictions associated with the first user account; and
prior to causing the user device to display the ranked list of content, removing content from the ranked list of content according to the restrictions.

19. The non-transitory computer-readable medium of claim 14, wherein generating the ranked list of content comprises generating a ranked list of items different from content associated with the interaction information.

20. The non-transitory computer-readable medium of claim 14, wherein the user interface is an audio interface of a virtual assistant service, and wherein causing the user device to present content at a user interface comprises causing the virtual assistant service to present content via the audio interface.

* * * * *